United States Patent Office 3,228,153
Patented Jan. 11, 1966

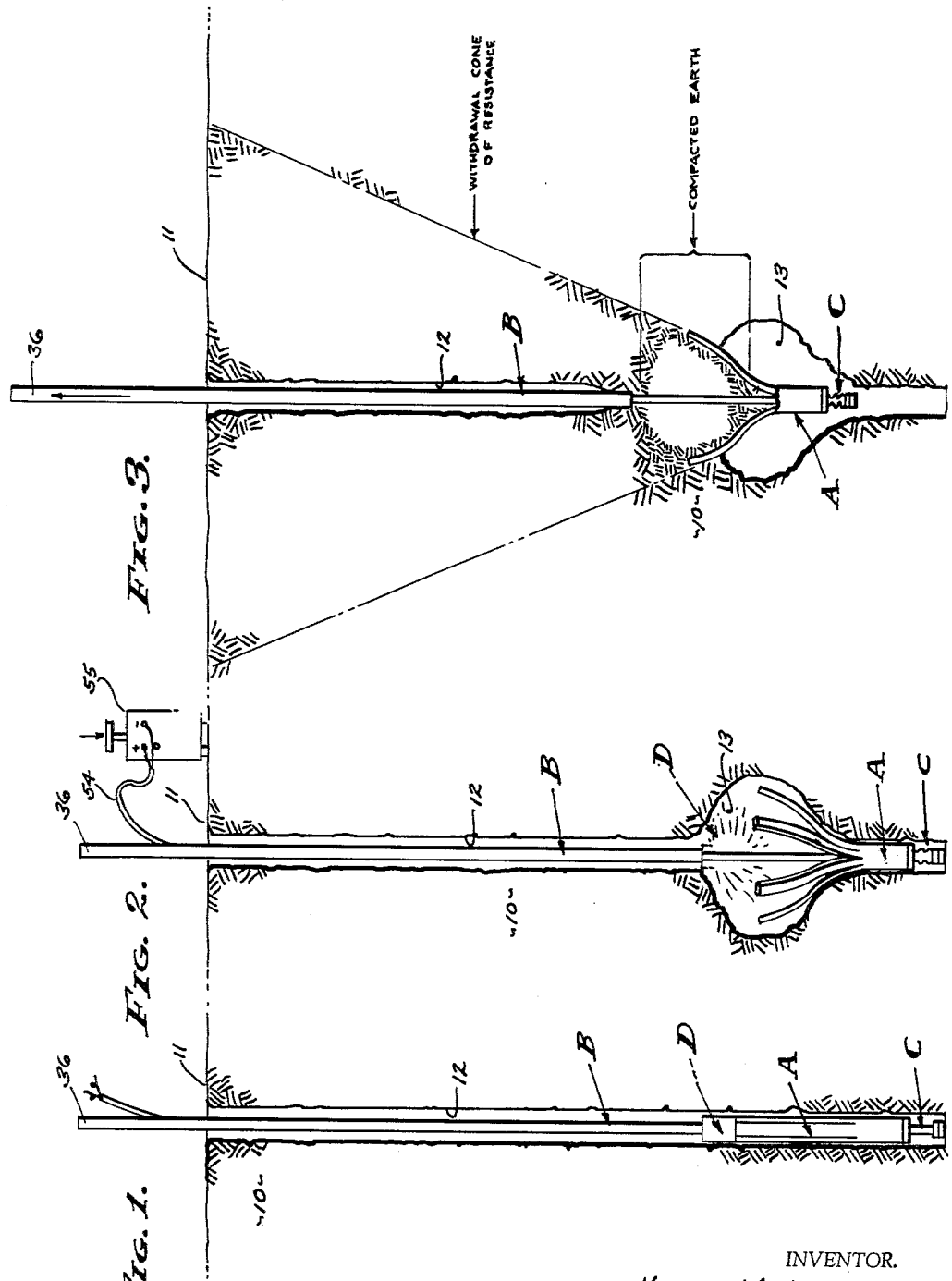

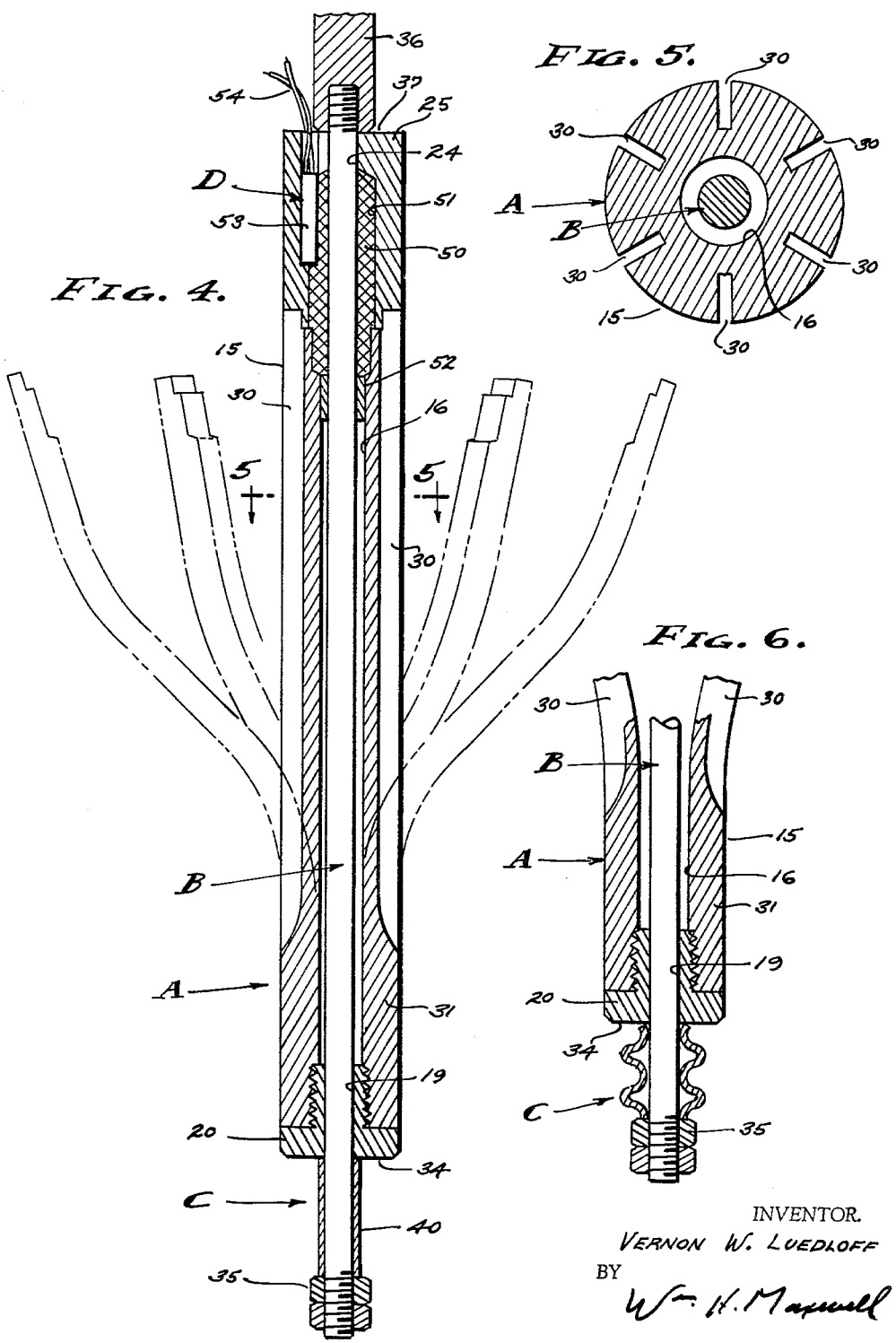

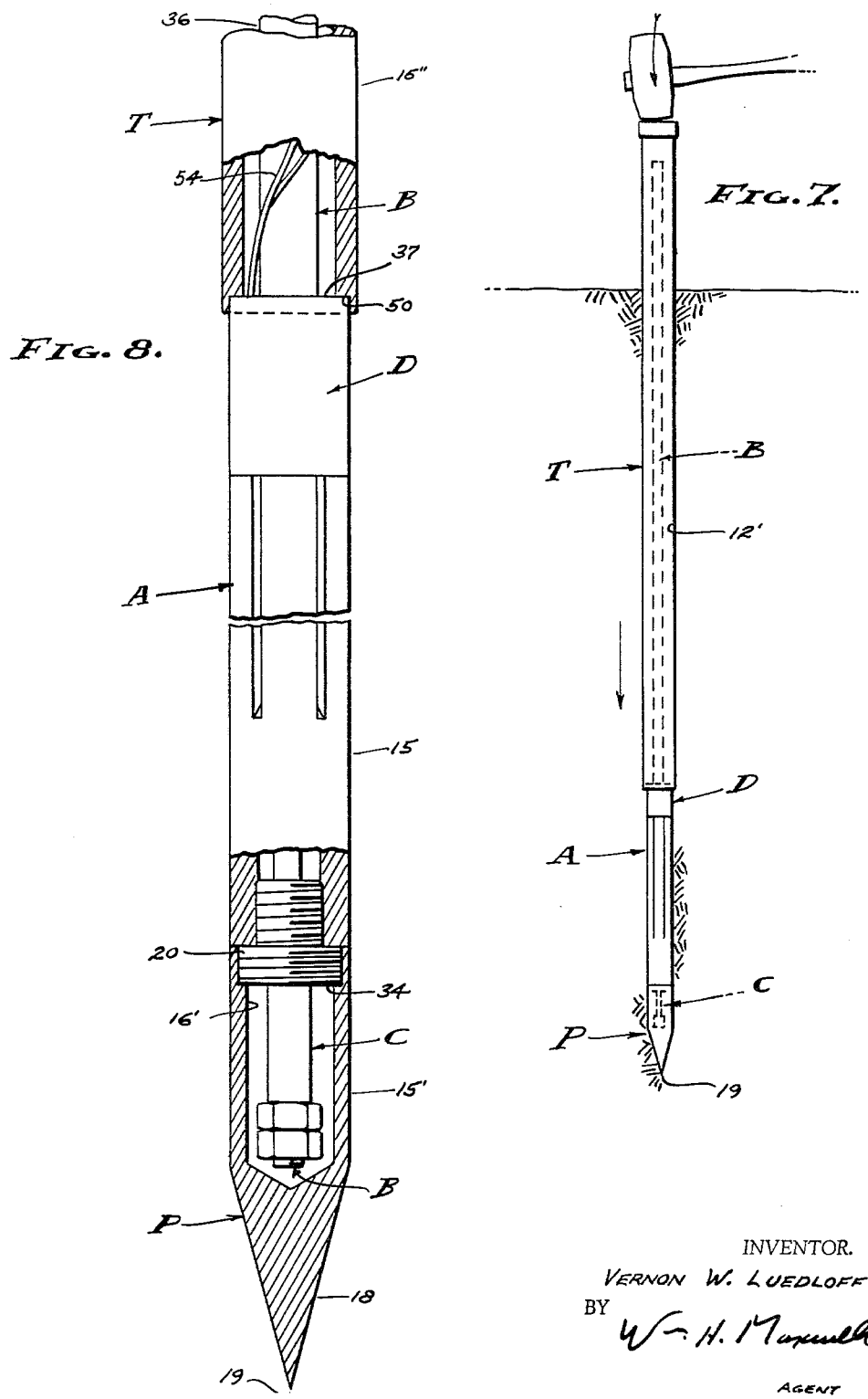

3,228,153
EXPLOSIVE ACTUATED ANCHOR
Vernon W. Luedloff, Torrance, Calif., assignor to Harvey Aluminum (Incorporated), Torrance, Calif., a corporation of California
Filed July 2, 1962, Ser. No. 206,690
7 Claims. (Cl. 52—156)

This invention relates to an explosive actuated anchor and is particularly concerned with an explosively expanded ground anchor, it being a general object of this invention to provide an anchor structure to be placed at a desired depth and actuated by an explosive charge to exand for engagement with the surrounding earth formation.

The anchoring and securement of the equipment in a fixed and safe condition is a requirement in many activities and enterprises. For example, the tie-down requirement for aircraft is many times a critical necessity, due to the relatively light weight of the aircraft and due to the high wind forces encountered when the aircraft is grounded. Also, there are many mobile pieces of equipment which require securement under certain circumstances, as for example various types of gun mounts and missile launchers. Further, the erection of buildings, either permanent or temporary, requires tie-down in many situations. Thus, it is apparent that there are many situations where anchors embedded in and beneath the ground are required, such as guy wire anchors used in the erection of poles or towers, and like structures.

It is an object of this invention to provide an anchor which is adapted to be inserted into a small diameter bore in the earth and which is operable to engage with the earth without further excavation and/or filling of earth overlying the same, and without the application of additional overlying bodies or members.

An object of this invention is to provide an anchor, operable as above set forth, which develops a holding power determined by the sum of the weight of earth contained within an overlying inverted cone thereof and of the cohesive resistance or shear strength of said earth act'ng on the total peripheral surface area of the said same withdrawal cone.

It is still another object of this invention to provide a relatively small and easily handled device which has utility in being inserted into a suitable bore in the earth, to be driven or lowered to a desired position and then operated, for the purpose of providing a reliable anchor in an extremely short length of time and with the use of minimum manpower.

The various objects and features of this invention will be fully understood from the following detailed description of the typical preferred forms and applications thereof, throughout which description reference is made to the accompanying drawings, in which:

FIGS. 1, 2 and 3 are sequential views that show the progressive steps involved in the installation of the anchor, FIG. 1 showing the initial insertion of the anchor unit into a bore and prior to detonation of the same, FIG. 2 showing the actuation of the unit and the condition thereof upon or just after detonation thereof, and FIG. 3 showing the resulting anchored engagement of the device with the overlying ground body.

FIG. 4 is an enlarged sectional view of the anchor device of the present invention, and showing the configuration and condition of the device acquired upon operation and actuation thereof.

FIG. 5 is an enlarged sectional view taken as indicated by line 5—5 on FIG. 4.

FIG. 6 is a view similar to a portion of FIG. 4 and showing in detail the configuration and movement of parts resulting from operation of the device.

FIGS. 7 and 8 are views similar to FIGS. 1 and 4 respectively and showing a second form of the invention adapted to be driven into the earth formation and thereby provide a bore for its accommodation.

It is well known that different earth formations possess different densities and different cohesive properties and weights and strengths. Therefore, experience and factual information can be used in order to determine exactly the holding power of a given anchor design beneath or within a certain body of earth formation. As expressed in the one foregoing objective, the holding power of the anchor hereinafter disclosed is the sum of the weight of effective overlying earth, the earth in an overlying inverted cone, and of the shear strength or cohesive resistance of the surface area of said effective earth or cone thereof. Thus, it is apparent that an exacting science is involved in determining said holding power, taking into account different types of earth and how they affect variations as for example in the overlying cone angle, etc.

The anchor of the present invention has utility in all angular dispositions, providing there is sufficient lateral supporting earth formation. Also, the anchor can be embedded in the earth formation 10 at any desired depth. In the drawings I have shown a vertically disposed installation of the anchor and at an angle normal to the ground surface 11. It is to be understood that the anchor can be inserted into a bore 12 in any desired manner, manually or mechanically as circumstances may require. In any case, in the first form, as shown in FIGS. 1 to 6, the bore is preformed, and when the anchor is properly placed (see FIG. 1), it is operated explosively to expand and to create a cavity 13, or camouflet, within which it engages itself well beneath the surface 11.

In accordance with the invention, the anchor device is of tubular construction, preferably round in cross-section, in which case the bore 12 is also round in cross-section and of a diameter and depth to accommodate said tubular construction. As shown, a portion or projection of the anchor device protrudes from the surface 11 for engagement with structure to be anchored and/or secured.

Generally, the anchor involves a body A, a stem B, stress absorbing means C, and explosive means D. The body A lends the tubular characteristic to the device and is deformable and such as to be worked from a pre-formed condition into an actuated condition. The stem B extends through the body A and remains unaltered, being shiftable in the body for operation of the means C and for applying seating forces to the expanded body. The stress absorbing means C operates between the relatively movable parts A and B of the device. And, the explosive means D is the operative element of the device which causes actuation thereof from the condition shown in FIG. 1 to the condition shown in FIG. 2.

The body A that is deformable from its initially preformed condition will be described in the said pre-formed condition. As shown in FIG. 4, the body A is an elongate cylindrical tube of metal having substantial wall thickness. Therefore, the body A has an outside diameter 15 to freely pass into the bore 12, and it has an inside diameter 16 concentric with the outside diameter. The lower, otherwise open, end of the body A is closed by a guide 20 having a concentric bore 19 therethrough to slidably pass the stem B. The upper, otherwise open, end of the body A is closed by a head 25 also having a concentric bore 24 therethrough to slidably pass the stem B. Thus, the body A is a tubular element closed at its bottom and top by the guide 20 and head 25, respectively, the stem B passing completely therethrough on the central axis of said body.

The characteristic feature of the present invention is the weakening of the body A in a direction longitudinally thereof. In the preferred form, a plurality of plans of weakness are provided along which the tubular wall of the body will split and/or divide under the influence of the operation of explosive means D. As shown, equally and circumferentially spaced striations, slots or grooves 30 extend longitudinally of the body A, said grooves being narrow and of a depth of about half the thickness of the tubular wall. It is also preferred that said grooves of weakening be cut inwardly from the outer diameter 15. In accordance with the invention the grooves 30 extend from the top end of the body A to the lower portion 31 thereof, but stopping short of the bottom end. The said grooves 30 gently merge with the outside diameter 15. Thus, the portion 31 remains intact for permanent joinder with the guide 20 above described.

The stem B that extends slidably through the body A is a straight elongate rod of cylindrical cross-section and of a diameter to have substantial clearance within the inner diameter 16. Thus, a substantial annulus is left remaining and surrounding the rod-like stem B. The lower end portion of the stem B carries a stop 35, in the form of a nut or nuts, engageable with the bottom 34 of the guide 20, so that upward forces are delivered through the stem and into the body A. The upper end portion of the stem B is adapted to be coupled to the structure o be anchored and preferably to a rod 36 of larger diameter and which forms an extension of the stem B. The lower end of the rod 36 seats on the upper face 37 of the head 25. In practice, the rod 36 is threaded onto the stem B and is a straight element of considerable length, whereby the depending body A can be inserted deeply into the bore 12. The uppermost end portion of the rod 36 projects above the ground surface 11 for suitable manipulation.

The stress absorbing means C that operates between the movable parts, operates between the body A and stem B, and more specifically between the botom 34 and stop 35. The means C comprises a compression tube 40 surrounding the stem B and engaged between the bottom 34 and stop 35. The tube 40 is of relatively soft metal and of lighter cross section than the stem B, to the end that the energy imparted to the body A and stem B, in opposite directions, is dissipated by wrinkling of the said compression tube, as indicated in the drawings. As a result, high impact stresses are not transmitted into the stem B and rod 36.

The explosive means D that is provided for operation to actuate the device comprises a charge 50 of explosive material located at and/or within the upper end portion of the inner diameter 16 of the body A. Since the stem B occupies the center area of the cross-section, the charge 50 is circular and surrounds the stem B, said charge being contained mainly within a cavity 51 in the head 25, and projecting somewhat into the body A. The cavity 51 opens downwardly into the annulus within the body A. Underlying the charge 50 there is a plug 52 to close the annulus and to back-up the charge.

Ignition of the charge 50 can be performed in any desired manner, preferably by means of a detonator 53. The detonator 53 is shown as being of the electrical type with a wire or wires 54 extending along the rod 36 and to and above the ground surface 11. A suitable electrical charging device 55 is used (FIG. 2) to energize the detonators 53 for operation of the means D and actuation of the device.

From the foregoing the complete structure of the first form of anchor device will be understood. In operation, the anchor in the form of a complete assemblage is inserted into and emplaced as desired in a pre-drilled bore 12 (FIG. 1). With the anchor assemblage in position at the desired depth below the ground surface 12, electrical energy is applied by the generator 55 through the wires 54 and to the detonator 53. The explosive charge 50 is thereby detonated and causes the anchor body A to split and/or divide along the plurality of grooves 30. As a result, the separated peripheral portions of the body A expand outwardly forming a plurality of lateral tangs substantially as indicated in FIG. 2. Simultaneously, with said explosion and expansion of the body A to form the tangs, above referred to, the force of the explosive charge 50 establishes the cavity 13, or camouflet, surrounding the body A as indicated in FIG. 2. Considerable axial force is exerted by the explosion, causing the body A to be driven downwardly relative to the stem B. The stress absorbing means C is operable to absorb said energy imparted to the body A and to dissipate the same by collapse of the tube 40, as above described.

In FIGS. 7 and 8, I have shown a second form of anchor which has all of the essentials of the first form hereinabove described, and which has the additional utility of being adapted to be driven into the earth formation. That is, in this second form the bore 12' is formed by and as the unit or assemblage is driven into the ground. In FIG. 7 I have shown the body A included in or incorporated in a combination involving, generally, a point P and a drive tube T. The anchor assemblage involves the stem B, stress absorbing means C and explosive means D, all as hereinabove described.

The point P which is included in the form of anchor now under consideration is in the nature of a cap that covers the workable elements A, B, and C at the lowermost end of the structure. As shown, the point P forms a continuation of the outside diameter 15 and is, therefore, round in cross-section having an outside diameter 15'. Since the stem B and elements of the means C project from the bottom 34 of the frame A, the cap-like point P is provided with a central bore 16' that accommodates said stem B and parts of means C. The upper end of the point P is thus of tubular form and is threadedly coupled to the lower end of the body A, for example to the periphery of the guide 20. The lower end of the point P is conical and pointed, having a tapered wall 18 converging to a vertex 19. It will be apparent that the parts of the anchor can move as illustrated in FIG. 6, all without interference from the point P, while being protected thereby.

The drive tube T which is included in the form of invention now under consideration is in the nature of a column that encloses the stem B. As shown, the drive tube T forms a continuation of the outside diameter 15 and is, therefore, round in cross-section having an outside diameter 15''. The tube T surrounds the upwardly projecting portion of the stem B, or more specifically the rod 36 and wires 54, and it has a shoulder at 50 to seat on the face 37. Both the shoulder at 50 and face 37 are normal to the central axis and the tube T is held concentric by a centering boss, as shown. It will be apparent that downward driving forces can be transmitted to the body A through the drive tube T, using a hammer, or an equivalent drive means, applied to the uppermost end of the drive tube T.

With the combination of elements including all of the anchor elements and all of the later described elements P and T, the assemblage is drivable, as is a stake or column, into the ground formation to form a bore 12' as it progresses downwardly. Upon reaching the desired level or position the tube T is removed, thereby exposing the rod 36 and wires 34 for operation of the explosive means D.

In order to set the anchor for final use, upward force is applied to the rod 36, by any convenient means, such as by means of a screw or jack, causing the expanded body A, or tangs, to engage and bite into the overlying earth forming the roof portion of the cavity 13 as indicated in FIG. 3. This seating action of the body A, or tangs thereof, causes the earth immediately within the area enclosed by the angularly related tangs to become consolidated and/or compacted, establishing a solid base beneath the overlying undisturbed earth. The said overlying undisturbed earth establishes the inverted anchoring cone of earth formation, as described and set forth above.

Having described typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. An anchor for actuation in a bore beneath ground surface including:
    an elongated tubular body with a plurality of planes of weakness extending longitudinally thereof between an upper end and a lower end,
    a stem extending upwardly through the body from the lower end thereof through the bore to the ground surface,
    stress absorbing means engaged between the lower end of the body and a stop on the stem, and
    an explosive charge at the upper end of the body operative to deform said body into a plurality of tangs for engagement with the bore.

2. A anchor for actuation in a bore beneath ground surface including:
    an elongated tubular body with a plurality of planes of weakness extending longitudinally thereof between an upper end and a lower end,
    a central stem extending through the lower end of the body and upwardly from the lower end thereof to the ground surface,
    stress absorbing means between the lower end of the body and a stop on the stem, and
    an annular explosive charge surrounding the stem within a portion of the body contiguous with its upper end operative to deform said body into a plurality of tangs for engagement with the bore.

3. An anchor for actuation in a bore beneath ground surface including:
    an elongated tubular body with a plurality of planes of weakness extending longitudinally thereof between an upper end and a lower end,
    a stem extending upwardly from the lower end through the body and the bore terminating contiguous with the ground surface,
    a stress absorbing collapsible tube engaged between the lower end of the body and a stop on the stem, and
    an explosive charge within the body near its upper end operative to laterally expand the body into a plurality of tangs for engagement with the bore.

4. An anchor for actuation in a bore beneath ground surface including:
    an elongated tubular body with a plurality of planes of weakness extending longitudinally thereof between an upper end and a lower end,
    a central stem extending through the lower end of the body and upwardly from the lower end through the body to the ground surface,
    a stress absorbing collapsible tube surrounding the stem and engaged between the lower end of the body and a stop on the stem, and
    an annular explosive charge surrounding the stem and within the body near its upper end operative to laterally expand the body into a plurality of tangs for engagement with the bore.

5. An explosive actuated anchor for insertion into a bore and for establishing a cavity upon actuation thereof for engagement of the anchor beneath ground surface including:
    an elongated tubular body with a plurality of planes of weakness extending longitudinally thereof between an upper end and a lower end,
    a central stem extending through the lower end of the body and upwardly through the body to the ground surface,
    a stress absorbing collapsible tube engaged between the lower end of the body and a stop on the stem, and
    an annular explosive charge surrounding the stem within the weakened body and directed to expand therein to deform said body and simultaneously enlarge the surrounding bore into a cavity such that the expanded body can be raised by the stem to engage a body of overlying earth.

6. Structure adapted to be explosively actuated below ground surface level to establish a subterranean ground anchor comprising in combination:
    an elongated tubular body with sidewall means, upper endwall means and lower endwall means defining a hollow annulus,
    the sidewall means having a plurality of planes of weakness extending longitudinally thereof and terminating in spaced relationship from the upper endwall means and the lower endwall means,
    the sidewall means further including a plane of weakness extending radially thereof intersecting the longitudinally extending panes of weakness of the sidewall means contiguous with the upper endwall means,
    central stem means extending longitudinally through the elongated tubular body and beyond the upper endwall means for establishing a mechanical connection between ground surface level and the tubular body,
    an explosive charge positioned within the hollow annulus of the tubular body contiguous with the upper endwall means,
    means for actuating the explosive charge to expand portions of the sidewall means radially forming tang means from the portions of the sidewall means and simultaneously forming a subterranean camouflet, and
    stop means mounted on the central stem means below the bottom endwall means for moving the expanded tubular body into penetrative engagement with subsurface material overlying the camouflet.

7. Structure adapted to be driven below ground surface level and explosively actuated to establish a subterranean ground anchor comprising in combination:
    an elongated tubular body with sidewall means, upper endwall means and lower endwall means defining a hollow annulus,
    ground piercing cap means mounted on the tubular body in covering relationship to the lower endwall means,
    the sidewall means having a plurality of planes of weakness extending longitudinally thereof and terminating in spaced relationship from the upper endwall means and the lower endwall means,
    the sidewall means further including a plane of weakness extending radially thereof intersecting the longitudinally extending planes of weakness of the sidewall means contiguous with the upper endwall means,
    central stem means extending longitudinally through the elongated tubular body and beyond the upper endwall means for establishing a mechanical connection between ground surface level and the tubular body,
    an explosive charge positioned within the hollow annulus of the tubular body contiguous with the upper end wall means, means for actuating the explosive charge to expand portions of the sidewall means radially forming tang means from the portions of the sidewall means and simultaneously forming a subterranean camouflet, and stop means mounted on the central stem means within the cap means for moving the expanded tubular body into penetrative engagement with subsurface material overlying the camouflet.

References Cited by the Examiner
UNITED STATES PATENTS

| | | | |
|---|---|---|---|
| 1,746,848 | 2/1930 | Bates | 114—206 |
| 2,269,646 | 1/1942 | Burke | 114—206 |
| 2,879,972 | 3/1959 | Porter | 175—2 |
| 3,018,752 | 1/1962 | Sorrell | 114—206 |

FOREIGN PATENTS 517,910   5/1921   France.

FRANK L. ABBOTT, *Primary Examiner.*
RICHARD W. COOKE, *Examiner.*